(12) United States Patent
Hashemzadeh

(10) Patent No.: US 8,318,879 B2
(45) Date of Patent: Nov. 27, 2012

(54) HIGH SOLIDS CONTENT SOLUTIONS OF ORGANOSILICONE COPOLYMERS WITH HIGH SILICONE CONTENT AND HIGH SOLIDS CONTENT, AND PROCESS FOR PREPARATION THEREOF, AND USE THEREOF

(75) Inventor: Abdulmajid Hashemzadeh, Burgkirchen (DE)

(73) Assignee: Wacker Chemie AG, München (DE)

( * ) Notice: Subject to any disclaimer, the term of this patent is extended or adjusted under 35 U.S.C. 154(b) by 376 days.

(21) Appl. No.: 12/375,340

(22) PCT Filed: Aug. 7, 2007

(86) PCT No.: PCT/EP2007/058188
§ 371 (c)(1),
(2), (4) Date: Jun. 15, 2009

(87) PCT Pub. No.: WO2008/017672
PCT Pub. Date: Feb. 14, 2008

(65) Prior Publication Data
US 2010/0022738 A1    Jan. 28, 2010

(30) Foreign Application Priority Data
Aug. 9, 2006 (DE) .................. 10 2006 037 272

(51) Int. Cl.
*C08F 30/08* (2006.01)
(52) U.S. Cl. ...... 526/279; 524/765; 424/401; 424/70.12
(58) Field of Classification Search .................. 524/765; 526/279; 424/70.12, 401
See application file for complete search history.

(56) References Cited

U.S. PATENT DOCUMENTS

| | | | |
|---|---|---|---|
| 6,020,445 A * | 2/2000 | Vanderlaan et al. | 526/279 |
| 6,534,590 B1 | 3/2003 | Aso et al. | |
| 2003/0114583 A1 | 6/2003 | Stark et al. | |
| 2003/0195316 A1 * | 10/2003 | Stark | 526/279 |
| 2005/0143547 A1 * | 6/2005 | Stark et al. | 528/25 |

FOREIGN PATENT DOCUMENTS

| | | |
|---|---|---|
| CN | 1646607 | 7/2005 |
| DE | 4330279 | 3/1994 |
| DE | 4240108 | 6/1994 |
| EP | 0352339 | 1/1990 |
| EP | 0810243 | 12/1997 |
| EP | 0937998 | 8/1999 |
| WO | WO 03 085035 | 10/2003 |

OTHER PUBLICATIONS

International Search Report, dated Oct. 8, 2007.

* cited by examiner

*Primary Examiner* — Margaret Moore
(74) *Attorney, Agent, or Firm* — RatnerPrestia

(57) ABSTRACT

The invention relates to soliconorganocopolymers with high silicon content, with a silicon content of $\geq 25$ wt. % in form of a high solid content solution thereof, with a solid content of >30 wt. %, obtainable with radically initiated solution polymerization of a) 20 to 75 wt. % of one or more ethylenic unsaturated monomers, and b) 25 to 80 wt. % of one or more silicones of the general formula $R^1_a R_{3-a} SiO(SiR_2O)_n SiR_{3-a} R^1_a$, wherein R is equal or different, and refers to a monovalent, possibly substitutes, alkyle- or alkoxy group with 1 to 18 C-atoms, $R^1$ refers to a polymerizable group, a is 0 or 1 and n=10 to 1000, wherein 85 to 100 wt. % of the silicones b) contain one or two polymerizable groups, wherein silicones b) with only one polymerizable group only in the mixture with silicones b) with two polymerizable groups and in a weight ratio <50/50 are used, wherein the wt. %-indications for the components a) to b) refer to the whole weight of the used monomers and add up to 100 wt. %, characterized in that the polymerization is carried out in a solvent or solvent mixture, wherein silicon b) comprises a solubility of less than 5 wt. % under normal conditions.

17 Claims, No Drawings

HIGH SOLIDS CONTENT SOLUTIONS OF ORGANOSILICONE COPOLYMERS WITH HIGH SILICONE CONTENT AND HIGH SOLIDS CONTENT, AND PROCESS FOR PREPARATION THEREOF, AND USE THEREOF

FIELD OF INVENTION

The invention relates to high silicone content organosilicone copolymers in the form of their high solids content solution and also to their preparation by free-radical solution polymerization, and use.

BACKGROUND OF INVENTION

Polysiloxanes and organosilicone copolymers find use in diverse fields of application, as, for example, additives to paints, varnishes, adhesives, and cosmetics, in textiles finishing, in plastics processing, or in papermaking and textile production.

Organosilicone copolymers are obtained, for example, by free-radical polymerization in organic solvents or in aqueous dispersion by emulsion polymerization or suspension polymerization. Owing to the poor compatibility of the reactants, particularly at a silicone fraction of more than 25% by weight, the polymerization during the preparation of organosilicone copolymers from olefinic monomers and silicones is accompanied by problems due to phase separation or gelling, which leads to hazing of the organosilicone copolymers. These problems occur particularly when the solids content is increased during the polymerization.

The free-radical solution polymerization is described, for example, in DE 4240108 A1, using toluene, xylene, and butyl acetate as solvents. In the course of the polymerization of free-radically polymerizable monomers, polysiloxane is embedded into a polymer matrix. The crosslinking of the polymer matrix and of the polysiloxanes takes place only following addition of a further component, at the application stage. Prior to crosslinking, there may be gelling and phase separation of the organosilicone copolymer components.

WO 03/085035 A1 describes a process of free-radical solution polymerization which uses solvent mixtures comprising at least two nonaqueous solvents. Also described are solutions of high silicone content organosilicone copolymers with a high solids content. This was achieved through the use of very specific solvent mixtures. However, all of the polymer compositions disclosed specifically with a solids content above 30% exhibit phase separation, gelling and/or crosslinking. Furthermore, the use of solvent mixtures is a disadvantage in terms of process engineering, since the solvent mixtures require distillative separation—which is costly and inconvenient—in order to allow the individual solvent components to be recycled.

Against this background, the object is to provide highly transparent, high silicone content organosilicone copolymers in the form of their high solids content solution, and an economically efficient process for their preparation.

DETAILED DESCRIPTION OF INVENTION

The invention provides high silicone content organosilicone copolymers having a silicone content of ≧25% by weight, in the form of their high-solids solution having a solids content of greater than 30% by weight, obtainable by means of free-radically initiated solution polymerization of a) 20% to 75% by weight of one or more ethylenically unsaturated monomers, and b) 25% to 80% by weight of one or more silicones of the general formula $R^1_a R_{3-a} SiO(SiR_2O)_n SiR_{3-a} R^1_a$, where each R is alike or different and is a monovalent, optionally substituted, alkyl radical or alkoxy radical having in each case 1 to 18 C atoms, $R^1$ is a polymerizable group, a is 0 or 1, and n=10 to 1000, 85% to 100% by weight of the silicones b) contain one to two polymerizable groups, and silicones b) having only one polymerizable group are used only in a mixture with silicones b) having two polymerizable groups, and in a weight ratio <50/50, the amounts in % by weight for components a) to b) being based in each case on the total weight of the monomers used, adding up to 100% by weight, characterized in that the polymerization takes place in a solvent or solvent mixture in which silicone b) has a solubility of less than 5% by weight under standard conditions.

The solvent or solvents in the solvent mixture are distinguished by the fact that they are nonsolvents for silicone b) and solvents for monomer a). Silicone b) is soluble therein at less than 5% by weight, and monomer a) at more than 5% by weight, under standard conditions (23/50) in accordance with DIN50014.

A preferred solvent is isopropanol. Preference is also given to mixtures of solvents composed of isopropanol and one or more solvents selected from the group of alcohols having 1 to 6 C atoms. Particularly preferred solvent mixtures are isopropanol and ethanol or isopropanol and propanol.

Solutions of high silicone content organosilicone copolymers are obtained preferably with a solids content of 30% to 90%, more preferably with a solids content of 40% to 90%, and very preferably with a solids content of 40% to 75%.

Preferred ethylenically unsaturated monomers a) are vinyl esters of unbranched or branched alkyl carboxylic acids having 1 to 15 C atoms or esters of acrylic acid or (meth)acrylic acid and unbranched or branched alcohols having 1 to 15 C atoms.

Preferred esters of acrylic acid or (meth)acrylic acid as unsaturated monomers a) are methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate. Particular preference is given to methyl acrylate, methyl methacrylate, n-, iso-, and tert-butyl acrylate, 2-ethylhexyl acrylate, and norbornyl acrylate.

Preferred vinyl esters as monomers a) are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 5 to 11 C atoms, examples being VeoVa9$^R$ or VeoVa10$^R$ (trade names of the company Resolution, vinyl esters of α-branched monocarboxylic acids having 9 or 10 C atoms). Particular preference is given to vinyl acetate, vinyl laurate, and VeoVa. Suitable comonomers are ethylene, propylene, 1,3-butadiene, and isoprene. Ethylene is preferred.

If desired it is also possible for 0.1% to 20% by weight, based on the total weight of the monomers employed, of auxiliary monomers to be copolymerized. Examples of auxiliary monomers are acrylic and methacrylic acid and monomers from the group of esters of acrylic acid or methacrylic acid, such as esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate. Particular preference is given to methyl acrylate, methyl methacrylate, n-, iso-, and tert-butyl acrylate, 2-ethylhexyl acrylate, and norbornyl acrylate. Further auxiliary monomers are also ethylenically unsaturated monocarboxylic acids, such as crotonic acid, and dicarboxylic acid, such as fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride. Further examples are precrosslinking comonomers such as poly-ethylenically unsaturated comonomers, examples being divinyl adipate, diallyl maleate, allyl methacrylate, butanediol diacrylate or triallyl cyanurate, or postcrosslinking comonomers, examples being acrylamido-glycolic acid (AGA), methacrylamidoglycolic acid methyl ester (MAGNE), N-methylolmethacryamide, N-methylol-allyl carbamate, alkyl ethers such as the isobutoxy ether or esters of N-methylolmethacrylamide and of N-methylolallyl carbamate.

Examples of radicals R in the general formula $R^1_a R_{3-a}SiO(SiR_2O)_nSiR_{3-a}R^1_a$ are methyl, ethyl, n-propyl, isopropyl, 1-n-butyl, 2-n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, cycloalkyl radicals such as cyclopentyl, cyclohexyl, cycloheptyl, and methylcyclohexyl radicals. Preferably the radical R is a monovalent hydrocarbon radical having 1 to 6 carbon atoms, such as methyl, ethyl, n-propyl, isopropyl, n-butyl, sec-butyl, amyl and hexyl radical, the methyl radical being particularly preferred.

Preferred alkoxy radicals R are those having 1 to 6 carbon atoms such as methoxy, ethoxy, propoxy, and n-butoxy radical, which if desired may also be substituted by oxyalkylene radicals such as oxyethylene or oxymethylene radicals. The methoxy and ethoxy radical are particularly preferred. The stated alkyl radicals and alkoxy radicals R may where appropriate also be substituted, as for example by halogen, mercapto groups, epoxy-functional groups, carboxyl groups, keto groups, enamine groups, amino groups, aminoethylamino groups, isocyanato groups, aryloxy groups, alkoxysilyl groups, and hydroxyl groups.

Suitable polymerizable groups $R^1$ are alkenyl radicals having 2 to 8 C atoms. Examples of such polymerizable groups are the vinyl, allyl, butenyl, and also acryloxyalkyl and methacryloxyalkyl group, the alkyl radicals containing 1 to 4 C atoms. Preference is given to the vinyl group, 3-methacryloxypropyl, acryloxy-methyl, and 3-acryloxypropyl group.

Preferred silicones b) are linear or branched polydialkylsiloxanes having a chain length of 10 to 1000, preferably from 20 to 500, $SiR_2O$ units. The fraction of silicone b) is preferably 25% to 80% by weight, based on the total weight of the units a), b), and, where used, c).

Particular preference is given to α,ω-divinyl-polydimethylsiloxanes, α,ω-di(3-acryloyloxypropyl)-polydimethylsiloxanes, α,ω-di(3-methacryloyloxypropyl)-polydimethylsiloxanes. In the case of the silicones substituted only once by unsaturated groups, preference is given to α-monovinyl-polydimethylsiloxanes, α-mono-(3-acryloyloxypropyl)-polydimethylsiloxanes, α-mono-(acryloyloxymethyl)-polydimethylsiloxanes, α-mono-(3-methacryoyloxypropyl)-polydimethylsiloxanes. In the case of the monofunctional polydimethylsiloxanes there is an alkyl or alkoxy radical, a methyl or butyl radical, for example, located at the other chain end.

Preference is also given to mixtures of linear or branched divinyl-polydimethylsiloxanes with linear or branched monovinyl-polydimethylsiloxanes and/or with nonfunctionalized polydimetylsiloxanes (the latter possess no polymerizable group). The vinyl groups are located preferably on the chain end. Examples of such mixtures are silicones of the solvent-free Dehesive® 6 series (branched) or Dehesive® 9 series (unbranched) from Wacker Chemie AG. In the case of the binary or ternary mixtures the fraction of the nonfunctional polydialkylsiloxanes is up to 15%, preferably up to 5%, by weight; the fraction of the monofunctional polydialkylsiloxanes is up to 50% by weight; and the fraction of the difunctional polydialkylsiloxanes is at least 50%, preferably at least 60%, by weight, based in each case on the total weight of the silicone fraction b).

Most preferred as silicone b) are α,ω-divinyl-polydimethylsiloxanes, or a binary mixture of α,ω-di-vinyl-polydimethylsiloxanes with α-monovinyl-polydimethylsiloxanes, or a ternary mixture of α,ω-divinyl-polydimethylsiloxanes, α-monovinyl-polydimethylsiloxanes with nonfunctionalized polydimethylsiloxane.

Besides these monomers it is also possible additionally for hydrolysable silane monomers c) to be copolymerized. Suitable hydrolysable silicon compounds are, for example, ethylenically unsaturated and hence copolymerizable silicon compounds of the general formula $R^3SiR^2_{0-2}(OR^4)_{1-3}$, where $R^2$ has the definition $C_1$ to $C_3$ alkyl radical, $C_1$ to $C_3$ alkoxy radical or halogen (e.g., Cl or Br), $R^3$ has the definition $CH_2=CR^3\text{-}(CH_2)_{0-1}$ or $CH_2=CR^5CO_2(CH_2)_{1-3}$, $R^4$ is an unbranched or branched, optionally substituted alkyl radical having 1 to 12 C atoms, preferably 1 to 3 C atoms, or is an acyl radical having 2 to 12 C atoms, it being possible for $R^4$, if appropriate, to be interrupted by an ether group, and $R^5$ is H or $CH_3$.

Preference is given to γ-acryl- and/or γ-methacryloyl-oxypropyltri(alkoxy)silanes, α-methacryloyloxymethyl-tri(alkoxy)silanes, γ-methacryloyloxypropylmethyldi-(alkoxy)silanes, vinylalkyldi(alkoxy)silanes, and vinyltri(alkoxy)silanes, the alkoxy groups which can be used being, for example, methoxy, ethoxy, methoxyethylene, ethoxyethylene, methoxypropylene glycol ether and/or ethoxypropylene glycol ether radicals. Examples of suitable silicon compounds are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, 3-metacryloyloxypropyltrimethoxysilane, 3-methacryloyloxypropylmethyldimethoxysilane, methacryloyloxymethyltrimethoxysilane, 3-meth-acryloyloxypropyltris(2-methoxyethoxy) silane, vinyltri-chlorosilane, vinylmethyldichlorosilane, vinyltris-(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene glycol-modified silanes.

Silanes that are the most preferred are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris-(2-methoxyethoxy)silane, 3-methacryloyloxypropyltri-methoxysilane, 3-methacryloyloxypropylmethyldimethoxy-silane, and methacryloyloxymethyltrimethoxysilane, and also mixtures thereof, especially mixtures of 2 or more silanes from the group encompassing 3-methacryloyloxy-propyltrimethoxysilane or methacryloyloxymethyltri-methoxoysilane with vinyltrimethoxysilane and vinyltri-ethoxysilane.

The most preferred organosilicone copolymers are those comprising as monomer units a) vinyl acetate, or vinyl acetate and ethylene, or vinyl acetate and VeoVa9 and, if desired, ethylene, or vinyl acetate and VeoVa10 and, if desired, ethylene, or vinyl acetate, vinyl laurate and, if desired, ethylene; and those comprising as silicone b) a binary mixture of α,ω-divinyl-polydi-methylsiloxane with α-monovinyl-polydimethylsiloxane or a ternary mixture of α,ω-divinyl-polydimethylsiloxane, α-monovinyl-polydimethylsiloxane with nonfunctionalized polydimethylsiloxane.

Particular preference is given to organosilicone copolymers prepared from 25-70% by weight of α,ω-di-vinyl-polydimethylsiloxane, 75-30% by weight of vinyl acetate, and, if desired, 5-20% by weight of monomers selected from the group encompassing VeoVa9, VeoVa10, vinyl laurate, and crotonic acid, the weight fractions of the individual monomers adding up to 100% by weight.

The invention further provides a process for preparing high silicone content organosilicone copolymers having a silicone content of ≧25% by weight, in the form of their high-solids solution having a solids content of greater than 30% by weight, obtainable by means of free-radically initiated solution polymerization of a) 20% to 75% by weight of one or more ethylenically unsaturated monomers, and
b) 25% to 80% by weight of one or more silicones of the general formula $R^1_a R_{3-a} SiO(SiR_2O)_n SiR_{3-a} R^1_a$, where each R is alike or different and is a monovalent, optionally substituted, alkyl radical or alkoxy radical having in each case 1 to 18 C atoms, $R^1$ is a polymerizable group, a is 0 or 1, and n=10 to 1000,
85% to 100% by weight of the silicones b) contain one to two polymerizable groups, and silicones b) having only one polymerizable group are used only in a mixture with silicones b) having two polymerizable groups, and in a weight ratio <50/50,
the amounts in % by weight for components a) to b) being based in each case on the total weight of the monomers used, adding up to 100% by weight, characterized in that the polymerization takes place in a solvent or solvent mixture in which silicone b) has a solubility of less than 5% by weight under standard conditions.

The reaction temperature is 20° C. to 100° C., preferably 40° C. to 80° C. Polymerization takes place generally at atmospheric pressure under reflux. Where monomers which are gaseous at room temperature are copolymerized, such as ethylene, preparation takes place under pressure, generally at between 1 and 100 bar. In general the polymerization is carried out to a solids content of 30% to 90%, preferably to a solids content of 40% to 90%, and more preferably to a solids content of 40% to 75%.

Suitable free-radical initiators are oil-soluble initiators, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butyl-peroxy)-3,3,5-trimethylcyclohexane, and di(4-tert-butylcyclohexyl) peroxydicarbonate. Also suitable are azo initiators such as azobisisobutyronitrile. The initiators are used generally in an amount of 0.005% to 3.0% by weight, preferably 0.1% to 1.5% by weight, based on the total monomer.

The setting of the molecular weight and of the degree of polymerization is known to the person skilled in the art. It can be done, for example, by adding regulator, through the ratio of isopropanol to monomers, by varying the initiator concentration, by varying the metering of monomers, and by varying the temperature. Regulators or chain transfer agents are, for example, acetaldehyde or compounds containing mercapto groups, such as dodecyl mercaptan or mercapto-containing silicones.

The polymerization can be carried out with all or some of the constituents of the reaction mixture included in the initial charge, or with portions thereof included in the initial charge and subsequent metering of the constituents, or of individual constituents, of the reaction mixture, or else by the metering method without an initial charge. A preferred procedure is to include 3% to 40% by weight of a mixture of the monomers a), b), and, if used, c) in the initial charge, in the desired proportions, and to meter in the remainder of the monomers a), b), and, where used, c) as a mixture. It is further preferred to include some of the initiator, preferably 3% to 50% by weight, in the initial charge and to meter in the remainder. With particular preference all of monomers b) and a portion of a) and, where used, of c) are included in the initial charge and the remainder is metered in.

In the form of a batch process, all the monomers, solvent (s), and a portion of the initiator are included in the initial charge and the remainder of the initiator is added in metered form or in portions.

When the polymerization is concluded, residual monomer can be removed by postpolymerization, employing known methods. Volatile residual monomers and other volatile constituents can also be removed by means of distillation or stripping methods, preferably under reduced pressure.

Following removal of the solvent and/or precipitation of the resin fraction, respectively, the organosilicone copolymers can be used in the form of a solution or as a solid resin. In the latter case the general procedure is to melt the resin and then process it to form granules.

The organosilicone copolymers are suitable for use as release agents and coating materials, as for example for producing abhesive (nontacky) coatings in release coating. They are also suitable for the coating of textiles, papers, films, and metals, as for example for protective coating or for an anti-fouling or anti-graffiti coating. A further field of application is that of architectural preservation, especially for producing weathering-resistant coatings or sealants. They are additionally suitable as modifiers and hydro-phobicizing agents, and as additives for cosmetics, such as hairsprays or hairsetting agents.

The organosilicone copolymers are used preferably for hydrophobicizing or for producing smooth surfaces of natural or synthetic materials in cosmetology, plastics, composites, paints, and varnishes. The organosilicone copolymers can be used either as a melt or as a solution in organic solvents, preferably in toluene, benzine, ethyl acetate or xylene, or in reactive diluent. Reactive diluents are substances of low molecular mass which contain at least one or more functional groups which as a result of one or more activations—simultaneously or in succession—lead to polymerization or crosslinking. Reactive diluents are, for example, monomers such as acrylates, methacrylates or styrene, which in the presence of corresponding initiators polymerize thermally or under irradiation (UV crosslinking). In the case of electron beam curing the polymerization takes place without initiator.

Poly-functional monomers include trimethylolpropane triacrylate, pentaethyritol triacrylate, ethoxylated and/or propoxylated trimethylolpropane triacrylate. Further reactive diluents include compounds having alike or unalike functional groups such as, for example, glycerol propoxylate triglycidyl ether, glycidyl methacrylate, (3-methacryloyloxypropyl)trimethoxysilane, (3-isocyanatopropyl)trimethoxysilane, (3-glycidyloxypropyl)triethoxysilane, and 3-(triethoxysilyl)propyl-succinic anhydride.

Application may take place in any desired way suitable for producing coatings from liquid substances and widely known, as for example by dipping, spreading, pouring, spraying, rolling on, printing, by means of an offset gravure coating device, by blade or knife-coating, or by means of an airbrush, for example.

With the procedure in accordance with the invention, organosilicone copolymers are made accessible that are distinguished by high transparency (glass-clear products) and negligible migration of the silicone fraction.

EXAMPLES:

PDMS Mixture:

Mixture of three polydimethylsiloxanes having a chain length of in each case about 100 dimethylsiloxane units, containing 5% by weight of nonfunctionalized polydimethylsiloxane, 20% by weight of α-monovinyl-polydimethylsiloxane, and 75% by weight of α,ω-divinyl-polydimethylsiloxane.

Example 1

A 2 l glass stirring pot with anchor stirrer, reflux condenser, and metering devices was charged with 407.0 g of isopropanol, 274.0 g of PDMS mixture, 547.0 g of vinyl acetate, 91.0 g of vinyl laurate, and 1.6 g of PPV (tert-butyl perpivalate, 75% strength solution in aliphatics). Subsequently the initial charge was heated to 75° C. at a stirrer speed of 200 rpm. When the internal temperature of 75° C. was reached, the metered addition of initiator (70 g of isopropanol and 4.1 g of PPV) was commenced (metering time 2 hours). After the end of the initiator feeds, postpolymerization took place for a further 2 hours at 75° C. This gave a clear polymer solution having a solids content of 65% by weight and a silicone fraction in the polymer of 30% by weight. Under vacuum and at elevated temperature, isopropanol was distilled off. The viscosity (Hoppler, 10% strength solution in ethyl acetate) was 3.17 mPas. The dry film from ethyl acetate solution (film thickness 70 micrometers) was clear.

Example 2

The procedure of example 1 was repeated but using VeoVa10 in place of vinyl laurate.

The viscosity (Hoppler, 10% strength solution in ethyl acetate) was 3.8 mPas. The dry film from ethyl acetate solution (film thickness 70 micrometers) was clear.

Example 3

A 2 l glass stirring pot with anchor stirrer, reflux condenser, and metering devices was charged with 407.0 g of isopropanol, 228.0 g of PDMS mixture, 152.0 g of vinyl acetate, and 1.6 g of PPV (tert-butyl perpivalate, 75% strength solution in aliphatics). Subsequently the initial charge was heated to 75° C. at a stirrer speed of 200 rpm. After the internal temperature of 75° C. had been reached, 532 g of vinyl acetate and initiator solution (70 g of isopropanol and 4.1 g of PPV) were metered in. The vinyl acetate was metered in over the course of 90 minutes and the initiator solution over the course of 120 minutes. After the end of the initiator feeds, postpolymerization took place for a further 2 hours at 75° C. This gave a clear polymer solution having a solids content of 65% by weight and a silicone fraction in the polymer of 25% by weight. Under vacuum and at elevated temperature, isopropanol was distilled off. The viscosity (Höppler, 10% strength solution in ethyl acetate) was 4.2 mpas. The dry film from ethyl acetate solution (film thickness 70 micrometers) was clear.

Comparative Example 1:

The procedure of example 1 was repeated but using methanol in place of isopropanol. In the course of the polymerization a sharp increase in viscosity was observed. After polymerization for about 2 hours, the polymer solution gelled.

Comparative Example 2:

The procedure of example 1 was repeated but using ethyl acetate in place of isopropanol. In this case as well, gelling of the polymer solution was observed.

Comparative Example 3:

The procedure of example 1 was repeated but using ethanol in place of isopropanol. In this case as well, gelling of the polymer solution was observed.

Comparative Example 4:

The procedure of example 3 was repeated, but the ethanol concentration was increased significantly. Following polymerization, a hazy polymer solution was obtained which had a solids content of 40% by weight.

The invention claimed is:
1. High silicone content organosilicone copolymers having a silicone content of ≧25% by weight, in the form of their high-solids solution in a solvent consisting of isopropanol having a solids content of greater than 30% by weight, obtainable by means of free-radically initiated solution polymerization of
   a) 20% to 75% by weight of one or more ethylenically unsaturated monomers, and
   b) 25% to 80% by weight of one or more silicones of the general formula $R^1{}_aR_{3-a}SiO(SiR_2O)_nSiR_{3-a}R^1{}_a$, where each R is alike or different and is a monovalent, optionally substituted, alkyl radical or alkoxy radical having in each case 1 to 18 C atoms, $R^1$ is a polymerizable group, a is 0 or 1, and n=10 to 1000,
   85% to 100% by weight of the silicones b) contain one to two polymerizable groups, and silicones b) having only one polymerizable group are used only in a mixture with silicones b) having two polymerizable groups, and in a weight ratio <50/50,
   the amounts in % by weight for components a) to b) being based in each case on the total weight of the monomers used, adding up to 100% by weight,
   characterized in that the polymerization takes place in isopropanol as solvent in which silicone b) has a solubility of less than 5% by weight under standard conditions,
   wherein the one or more ethylenically unsaturated monomers a) are selected from the group consisting of methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate, vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 5 to 11 C atoms, ethylene, propylene, 1,3-butadiene and isoprene.

2. The high silicone content organosilicone copolymers of claim 1, characterized in that solutions of high silicone content organosilicone copolymers having a solids content of 30% to 90% are obtained.

3. The high silicone content organosilicone copolymers of claim 1, characterized in that one or more silicones from the group consisting of α,ω-divinyl-polydimethylsiloxanes, α,ω-di(3-acryloyloxypropyl)-polydimethylsiloxanes, α,ω-di(3-meth-acryloyloxypropyl)-polydimethylsiloxanes, α-monovinyl-polydimethylsiloxanes, α-mono-(3-acryloyloxypropyl)-polydimethylsiloxanes, α-mono-(acryloyloxymethyl)-polydimethylsiloxanes, α-mono-(3-methacryoyloxypropyl)-polydimethylsiloxanes are used as silicone b).

4. The high silicone content organosilicone copolymers of claim 1, characterized in that α,ω-divinyl-polydimethylsiloxanes, or a binary mixture of α,ω-divinyl-polydimethylsiloxanes with α-monovinyl-polydimethylsiloxanes, or a ternary mixture of α,ω-divinyl-polydimethylsiloxanes, α-monovinyl-polydimethylsiloxanes with nonfunctionalized polydimethylsiloxane are used as silicone b).

5. The high silicone content organosilicone copolymers of claim 1, characterized in that vinyl esters selected from the group consisting of vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 5 to 11 C atoms, or esters of acrylic acid or methacrylic acid selected from the group consisting of methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate and norbornyl acrylate, are used as monomers a).

6. The high silicone content organosilicone copolymers of claim 1, characterized in that one or more monomers selected from the group consisting of methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, and norbornyl acrylate are used as monomers a).

7. The high silicone content organosilicone copolymers of claim 1, characterized in that vinyl acetate, or vinyl acetate and ethylene, or vinyl acetate and vinyl esters of α-branched monocarboxylic acids having 5 to 11 C atoms, or vinyl acetate and VeoVa9, or vinyl acetate and VeoVa9 and ethylene, or vinyl acetate and VeoVa10, or vinyl acetate and VeoVa10 and ethylene, or vinyl acetate and vinyl laurate, or vinyl acetate and vinyl laurate and ethylene, or ethylene and vinyl esters of α-branched monocarboxylic acids having 5 to 11 C atoms, are used as monomers a).

8. A process for preparing high silicone content organosilicone copolymers having a silicone content of ≧25% by weight, in the form of their high-solids solution in a solvent consisting of isopropanol having a solids content of greater than 30% by weight, obtainable by means of free-radically initiated solution polymerization of
 a) 20% to 75% by weight of one or more ethylenically unsaturated monomers, and
 b) 25% to 80% by weight of one or more silicones of the general formula $R^1_a R_{3-a} SiO(SiR_2O)_n SiR_{3-a} R^1_a$, where each R is alike or different and is a monovalent, optionally substituted, alkyl radical or alkoxy radical having in each case 1 to 18 C atoms, $R^1$ is a polymerizable group, a is 0 or 1, and n=10 to 1000,
 85% to 100% by weight of the silicones b) contain one to two polymerizable groups, and silicones b) having only one polymerizable group are used only in a mixture with silicones b) having two polymerizable groups, and in a weight ratio <50/50,
 the amounts in % by weight for components a) to b) being based in each case on the total weight of the monomers used, adding up to 100% by weight,
 characterized in that the polymerization takes place in isopropanol as solvent in which silicone b) has a solubility of less than 5% by weight under standard conditions,
 wherein the one or more ethylenically unsaturated monomers a) are selected from the group consisting of methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate, vinyl acetate, vinyl propionate, vinyl butyrate, vinyl 2-ethylhexanoate, vinyl laurate, 1-methylvinyl acetate, vinyl pivalate, vinyl esters of α-branched monocarboxylic acids having 5 to 11 C atoms, ethylene, propylene, 1, 3-butadiene and isoprene.

9. The process for preparing high silicone content organosilicone copolymers of claim 8, characterized in that all the monomers, solvent(s), and a portion of the initiator are included in the initial charge and the remainder of the initiator is added in metered form or in portions.

10. The process for preparing high silicone content organosilicone copolymers of claim 8, characterized in that 3% to 40% by weight of a mixture of the monomers a) and b) in the desired proportions is included in the initial charge and the remainder of the monomers a) and b) as a mixture is metered in.

11. An adhesive coating comprising, as release agents or coating materials, the high silicone content organosilicone copolymers of claim 1.

12. A material for coating textile, paper, films, and metals, comprising the high silicone content organosilicone copolymers of claim 1.

13. A weathering-resistant coating or sealant for architectural preservation, comprising the high silicone content organosilicone copolymers of claim 1.

14. A modifier or hydrophobicizing agent comprising the high silicone content organosilicone copolymers of claim 1.

15. A cosmetic comprising as an additive the high silicone content organosilicone copolymers of claim 1.

16. The cosmetic of claim 15, wherein the cosmetic is a hairspray.

17. The cosmetic of claim 15, wherein the cosmetic is a hairsetting agent.

* * * * *